(12) United States Patent
Gatling et al.

(10) Patent No.: US 9,089,952 B2
(45) Date of Patent: Jul. 28, 2015

(54) ELECTRONIC IDENTIFIER ATTACHMENTS FOR BITS

(75) Inventors: William Edward Gatling, Acworth, GA (US); Christopher John Ruf, Sandy Springs, GA (US)

(73) Assignee: Stanley Black & Decker, Inc., New Britain, CT (US)

( * ) Notice: Subject to any disclaimer, the term of this patent is extended or adjusted under 35 U.S.C. 154(b) by 242 days.

(21) Appl. No.: 13/585,300

(22) Filed: Aug. 14, 2012

(65) Prior Publication Data
US 2014/0048605 A1    Feb. 20, 2014

(51) Int. Cl.
| | |
|---|---|
| *B25B 15/00* | (2006.01) |
| *G06K 19/04* | (2006.01) |
| *G06K 19/077* | (2006.01) |
| *B23B 45/00* | (2006.01) |
| *B25B 21/00* | (2006.01) |
| *B21J 15/10* | (2006.01) |

(52) U.S. Cl.
CPC ............. *B25B 15/001* (2013.01); *B21J 15/10* (2013.01); *B23B 45/00* (2013.01); *B25B 21/00* (2013.01); *G06K 19/04* (2013.01); *G06K 19/07758* (2013.01); *B23B 2270/36* (2013.01)

(58) Field of Classification Search
CPC ............ G06K 19/0775; G06K 19/07749; G06K 19/04; G06K 19/07758; H01Q 1/22; H01Q 1/2208; H01Q 1/27; B25B 15/001; B25B 21/00; B23B 45/00; B23B 2270/36; B21J 15/10
USPC ................ 235/492; 340/10.42, 10.52, 572.7
See application file for complete search history.

(56) References Cited

U.S. PATENT DOCUMENTS

| | | | |
|---|---|---|---|
| 353,756 | A | 12/1886 | Parkhurst |
| 1,984,839 | A | 12/1934 | Murray |
| 3,251,150 | A | 5/1966 | Sedgwick |
| 4,588,339 | A | 5/1986 | Bilz |
| 4,720,907 | A | 1/1988 | Rapp |
| 5,029,485 | A | 7/1991 | Marr |
| 5,101,695 | A | 4/1992 | Johnson |
| D353,756 | S | 12/1994 | Graves |
| D472,778 | S | 4/2003 | Halstead |
| 6,682,156 | B2 | 1/2004 | Herrington |
| 6,827,275 | B2 | 12/2004 | Allen |
| 6,840,451 | B2 | 1/2005 | Allen |
| 6,989,749 | B2 | 1/2006 | Mohr |
| 7,240,845 | B2 | 7/2007 | Komine et al. |
| 7,253,736 | B2 | 8/2007 | Tethrake et al. |
| 7,256,699 | B2 | 8/2007 | Tethrake et al. |
| 7,315,248 | B2 | 1/2008 | Egbert |
| 7,333,016 | B2 | 2/2008 | Ancel |

(Continued)

FOREIGN PATENT DOCUMENTS

| | | |
|---|---|---|
| DE | 102008013588 A1 | 9/2009 |
| EP | 2395457 A1 | 12/2011 |

(Continued)

*Primary Examiner* — Kristy A Haupt
(74) *Attorney, Agent, or Firm* — Thomas | Horstemeyer, LLP

(57) ABSTRACT

Disclosed are various embodiments for attaching an electronic identification device to bits, such as drill bits and driver bits. A bit identification assembly is configured to attach to a bit. The bit identification assembly may include a core having a bit receptacle where a bit is retained. An electronic identification device may be attached to the core to facilitate identifying and tracking the bit to which the bit identification assembly is attached.

43 Claims, 7 Drawing Sheets

(56) References Cited

U.S. PATENT DOCUMENTS

| | | |
|---|---|---|
| 7,336,181 B2 | 2/2008 | Nowak et al. |
| 7,339,477 B2 | 3/2008 | Puzio et al. |
| 7,391,326 B2 | 6/2008 | Puzio et al. |
| 7,431,682 B2 | 10/2008 | Zeiler et al. |
| 7,483,766 B1 | 1/2009 | Frankel |
| 7,557,709 B2 | 7/2009 | Flores et al. |
| 7,586,417 B2 | 9/2009 | Chisholm |
| 7,705,482 B2 | 4/2010 | Leininger |
| 7,705,733 B2 | 4/2010 | Tethrake et al. |
| 7,740,425 B2 | 6/2010 | Zeiler et al. |
| 7,755,482 B2 | 7/2010 | Hubbard |
| 7,819,318 B2 | 10/2010 | White et al. |
| 7,932,824 B2 | 4/2011 | Flores et al. |
| 8,020,768 B2 | 9/2011 | Ramos-Elizondo et al. |
| 8,035,518 B2 | 10/2011 | Kolton et al. |
| 8,040,221 B2 | 10/2011 | Murray et al. |
| 8,047,746 B2 | 11/2011 | Olsson |
| 8,159,345 B2 | 4/2012 | Stevens |
| 8,193,938 B2 | 6/2012 | Halberthal et al. |
| 8,212,226 B2 | 7/2012 | Chisholm |
| 8,242,914 B2 | 8/2012 | Matityaho et al. |
| 8,316,742 B2 * | 11/2012 | Craig et al. .................. 82/1.11 |
| 2003/0102970 A1 | 6/2003 | Creel et al. |
| 2003/0105599 A1 | 6/2003 | Fisher et al. |
| 2004/0200980 A1 | 10/2004 | Blackwell |
| 2006/0085297 A1 | 4/2006 | Minerley |
| 2007/0124220 A1 | 5/2007 | Griggs et al. |
| 2007/0152046 A1 | 7/2007 | Hsieh |
| 2007/0244470 A1 | 10/2007 | Barker, Jr. et al. |
| 2007/0262867 A1 | 11/2007 | Westrick et al. |
| 2007/0278786 A1 | 12/2007 | Mezhinsky et al. |
| 2008/0115636 A1 | 5/2008 | DeRose et al. |
| 2008/0177267 A1 | 7/2008 | Sands et al. |
| 2008/0252446 A1 | 10/2008 | Dammertz |
| 2008/0262526 A1 | 10/2008 | Neubardt et al. |
| 2008/0303674 A1 | 12/2008 | Hara et al. |
| 2009/0175694 A1 | 7/2009 | Craig et al. |
| 2009/0283595 A1 | 11/2009 | White et al. |
| 2010/0096455 A1 | 4/2010 | Binmore |
| 2010/0252626 A1 | 10/2010 | Elizondo et al. |
| 2010/0277277 A1 | 11/2010 | Green et al. |
| 2010/0289626 A1 | 11/2010 | Oberle et al. |
| 2011/0025469 A1 | 2/2011 | Erdmann et al. |
| 2011/0057854 A1 | 3/2011 | Elbinger et al. |
| 2011/0109093 A1 | 5/2011 | Leininger |
| 2012/0007748 A1 | 1/2012 | Forgues et al. |
| 2013/0063254 A1 * | 3/2013 | Hanks et al. .................. 340/10.42 |

FOREIGN PATENT DOCUMENTS

| | | |
|---|---|---|
| GB | 2451957 A | 2/2009 |
| GB | 2465807 A | 6/2010 |
| JP | 2007183840 | 7/2007 |
| WO | 2006100283 A1 | 3/2006 |

* cited by examiner

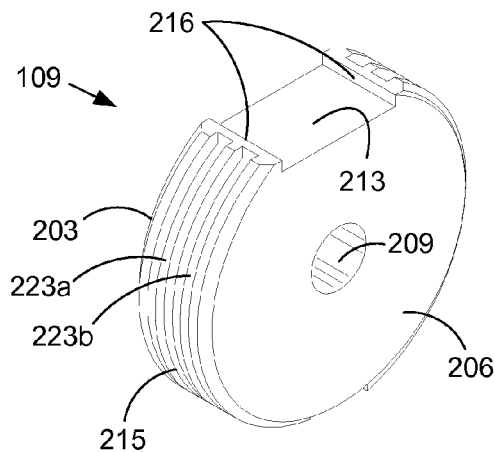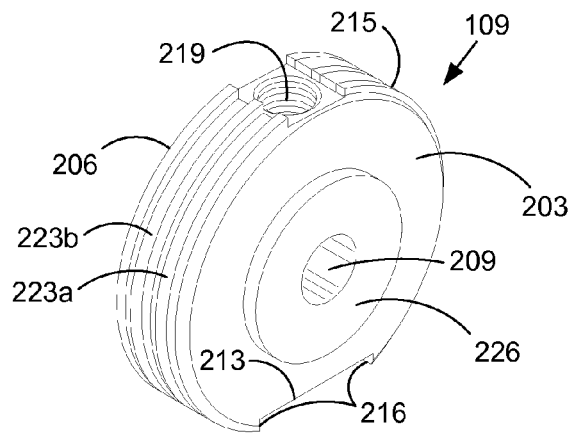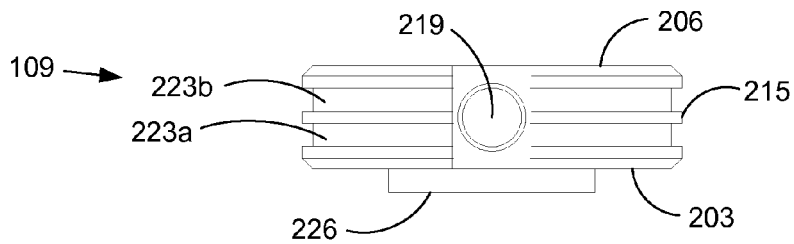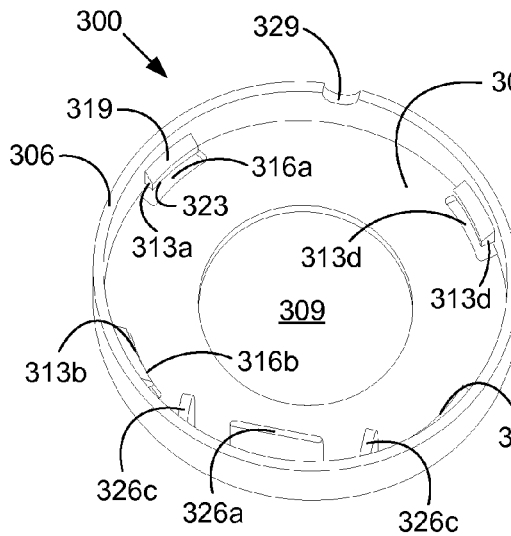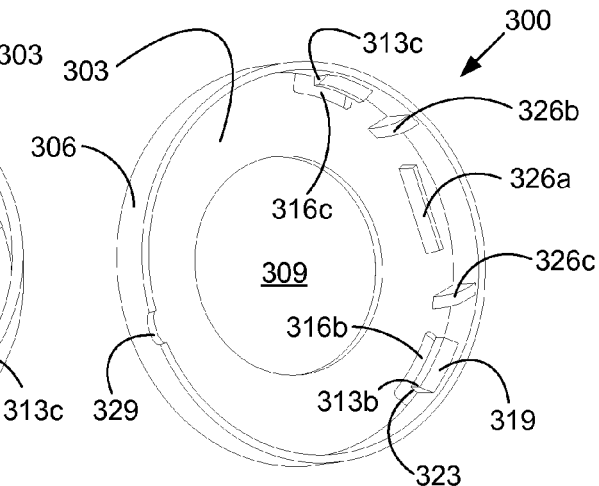

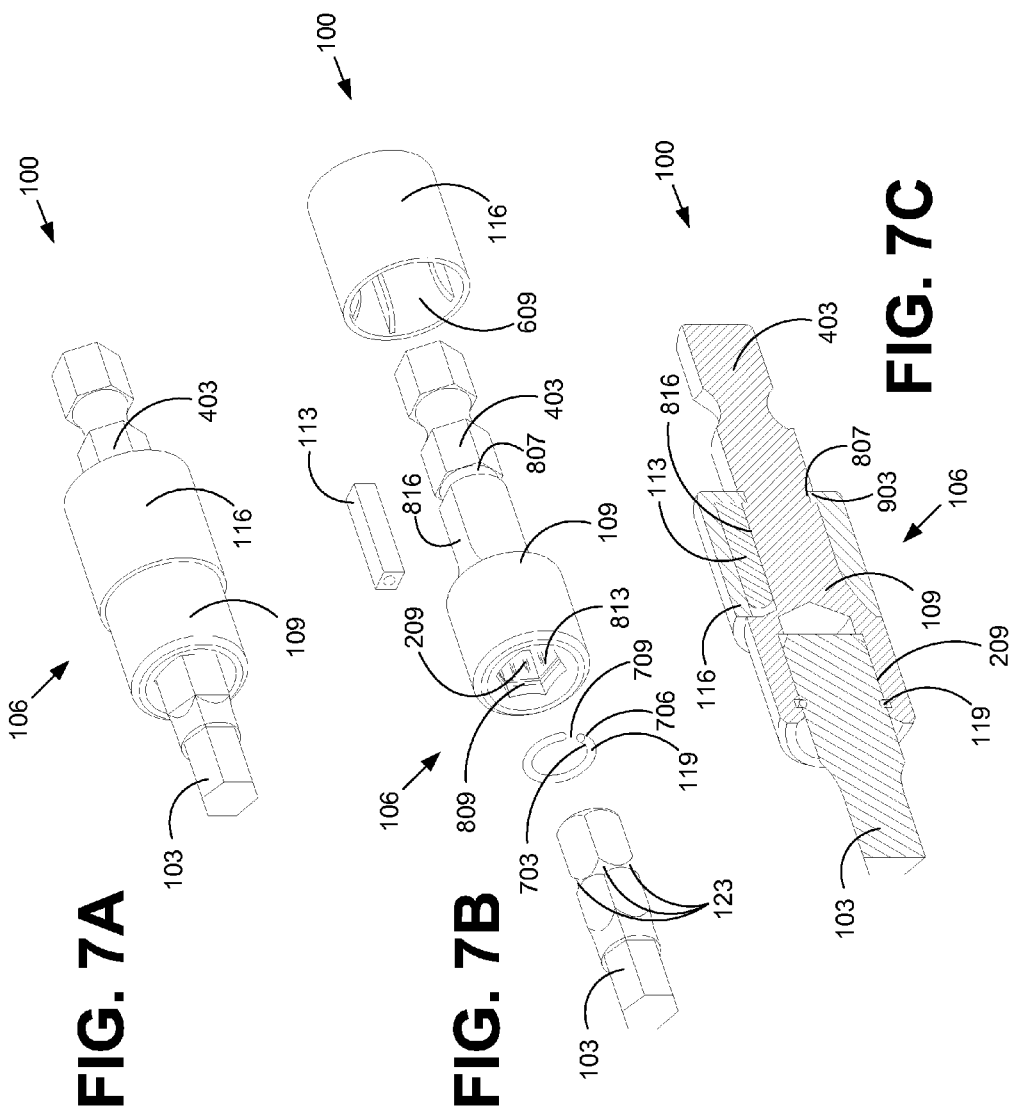

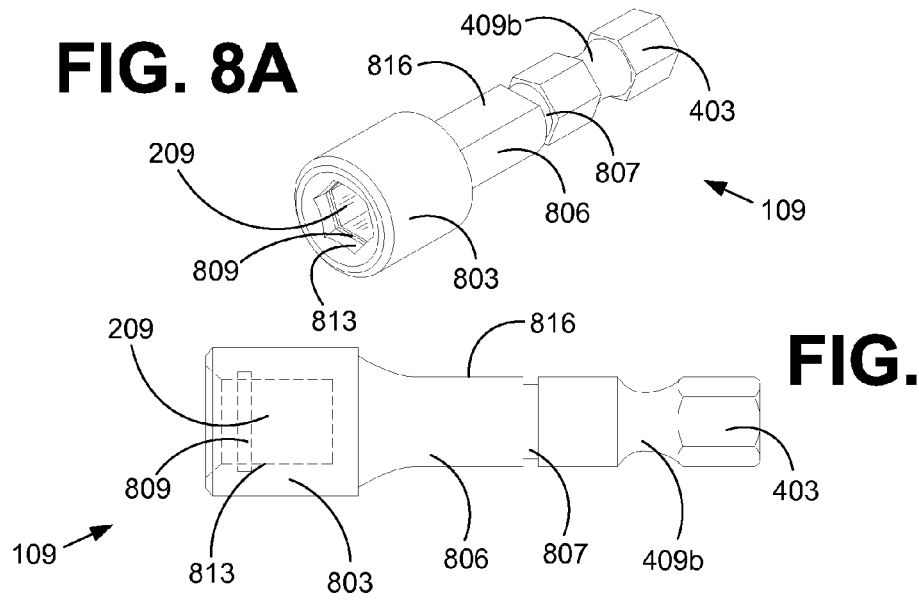
FIG. 8A
FIG. 8B
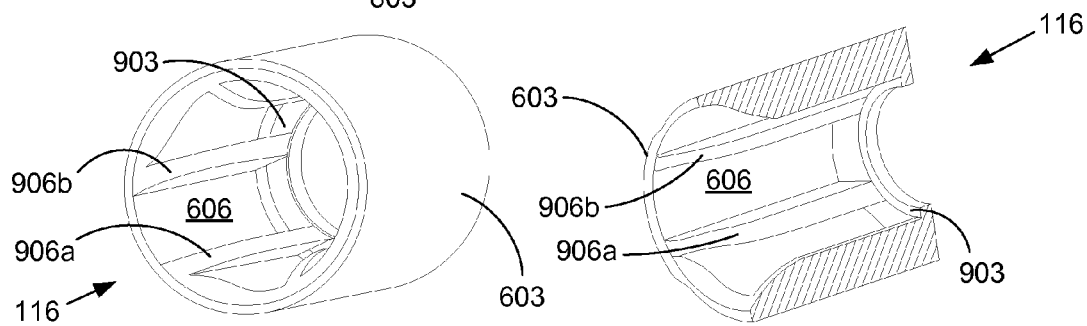
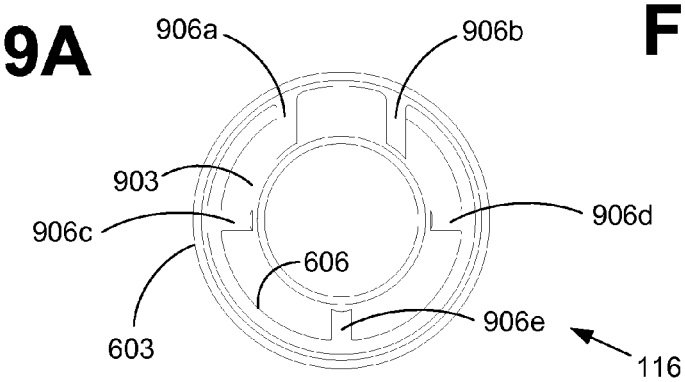
FIG. 9A
FIG. 9B
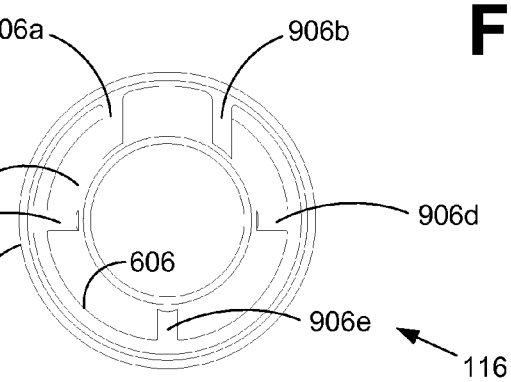
FIG. 9C

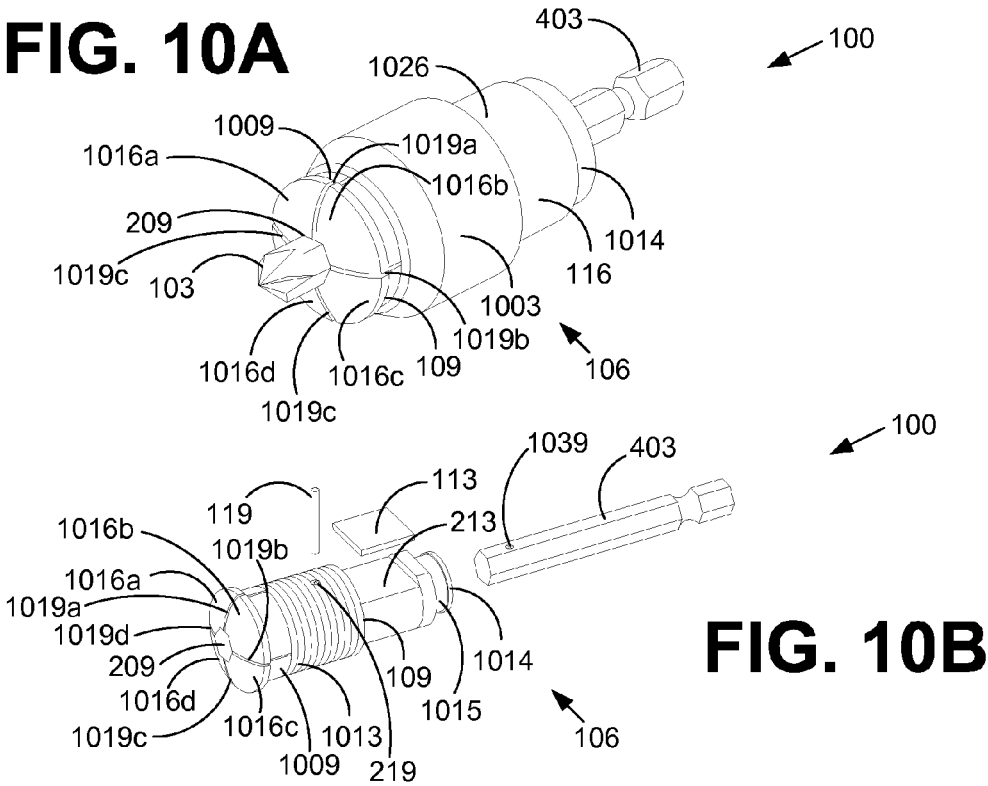
FIG. 10A
FIG. 10B
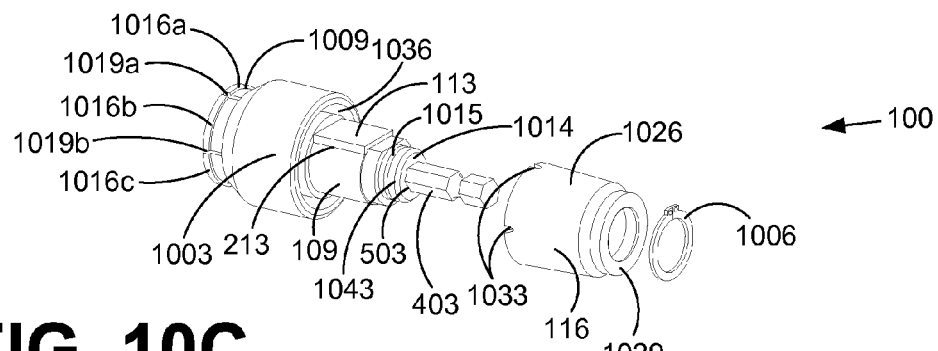
FIG. 10C
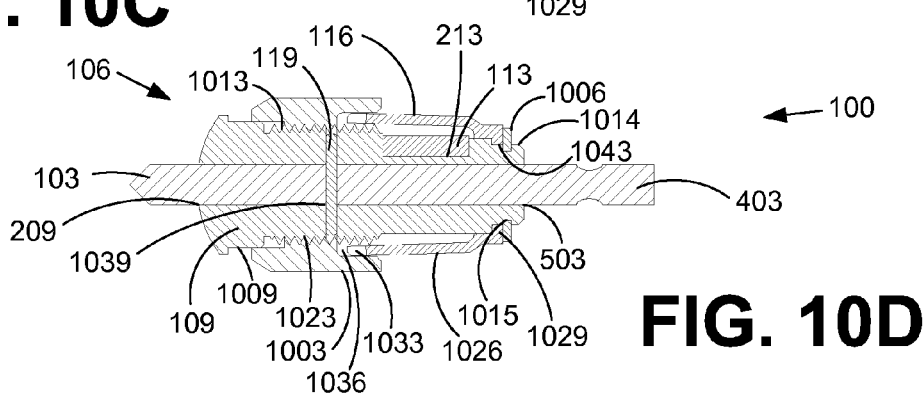
FIG. 10D

ELECTRONIC IDENTIFIER ATTACHMENTS FOR BITS

BACKGROUND

A Radio Frequency Identification (RFID) tag is a type of electronic identification device that may be used to identify and track various objects. In practice, an RFID tag is attached to an object, and an RFID reader senses the presence and identifying information associated with the RFID tag. The RFID reader may be located at an entrance or exit of an environment, thus facilitating the tracking and identification of RFID-enabled objects that enter or exit the environment. By being able to track RFID-enabled objects, it is less likely that these objects may become misplaced.

RFID tags may be added to existing objects. To this end, an RFID tag may be mounted directly to the exterior of an object using adhesives or shrink-wrap. However, it may be impractical to use adhesives or shrink-wrap to mount an RFID tag to, for example, a drill bit. In many cases, an RFID tag mounted directly to the exterior of the drill bit may prevent the bit from accessing a workpiece. Even further, gluing or shrink-wrapping an RFID tag to a bit may create an unbalanced rotation of the bit when in use, thereby presenting a hazard to personnel and equipment.

In order to overcome these obstacles, some objects may be manufactured to incorporate an RFID tag. However, it may be expensive to replace existing objects with new RFID-enabled objects. For example, a mechanic shop may have a huge inventory of drill bits. Additionally, drill bits may become worn and need to be replaced frequently. Replacing a large inventory of RFID-enabled tools that have been manufactured to incorporate an RFID tag may be expensive and impractical.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2A-2C are drawings of an example of a core for the bit assembly of FIGS. 1A-1C according to various embodiments of the present disclosure.

FIGS. 3A-3B are drawings of an example of a cover for the bit assembly of FIGS. 1A-1C according to various embodiments of the present disclosure.

FIGS. 7A-7C are drawings of another example of a bit assembly according to various embodiments of the present disclosure.

FIGS. 8A-8B are drawings of an example of a core for the bit assembly of FIGS. 7A-7C according to various embodiments of the present disclosure.

FIGS. 9A-9C are drawings of an example of a cover for the bit assembly of FIGS. 7A-7C according to various embodiments of the present disclosure.

FIGS. 10A-10D are drawings of another example of a bit assembly according to various embodiments of the present disclosure.

DETAILED DESCRIPTION

The present disclosure is directed towards attachments for bits, such as but not limited to drill bits and driver bits, that facilitate identifying and tracking the bits. A non-limiting example follows. A bit identification assembly is attached to a bit. The bit identification assembly includes a metal core, an RFID tag, and a plastic cover that covers the core and the RFID tag. The RFID tag transmits an identifying signal that facilitates the RFID tag being identified among other RFID tags.

With the bit identification assembly attached to the bit, an RFID reader may identify and track the bit by sensing the signals emitted from the RFID tag. As such, an RFID tag reader may be installed at an entrance or exit of an environment, such as a tool storage room, and the activity associated with the RFID tag may be monitored. This monitoring may be especially useful, for example, in surgical operating rooms where it is extremely important to track medical tools, in mechanical shops where a lost tool may cause damage to equipment, in an environment where inventory item theft may be a concern, or in other environments. In the following discussion, a general description of the systems, apparatus, and their components are provided, followed by a discussion of the operation of the same.

Figure 1A:
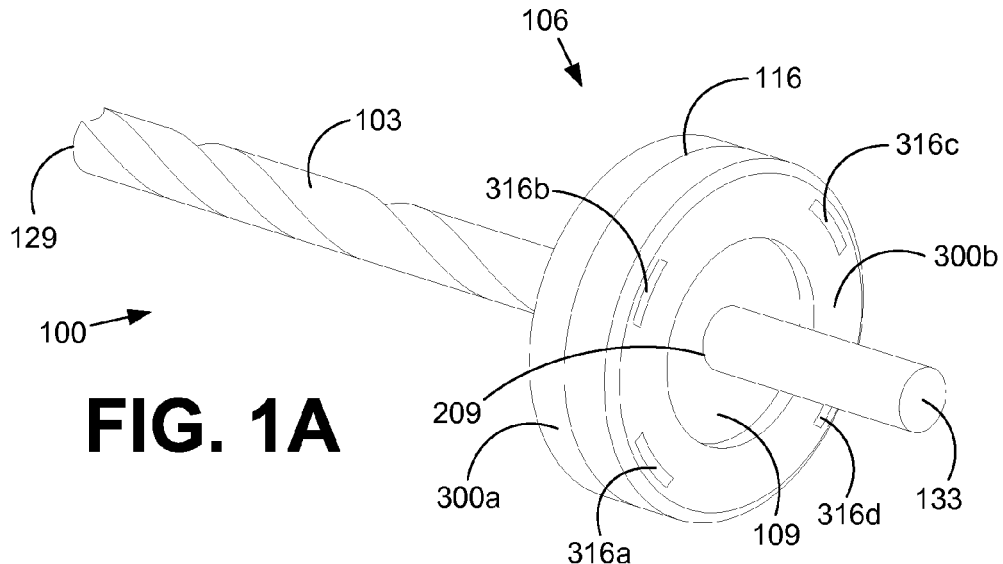
FIGS. 1A-1C are drawings of an example of a bit assembly according to various embodiments of the present disclosure.
Figure 1B:
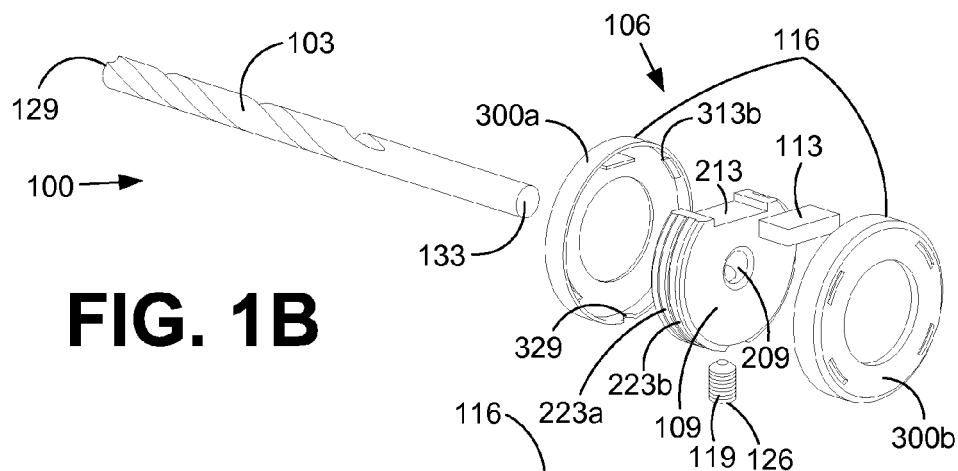
Figure 1C:
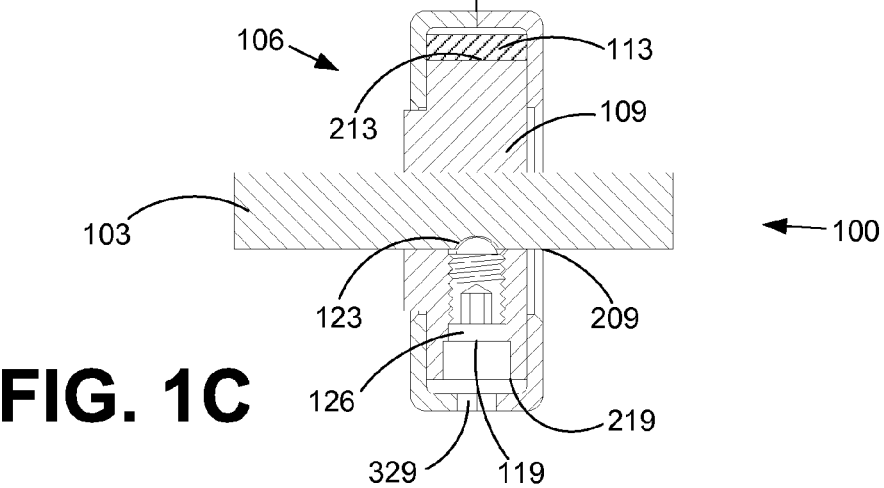

With reference to FIGS. 1A-1C, shown is an example of a bit assembly 100 according to various embodiments of the present disclosure. In particular, FIG. 1A shows a perspective view of the bit assembly 100, FIG. 1B shows an exploded view of the bit assembly 100, and FIG. 1C shows a cross section of a portion of the bit assembly 100. The bit assembly 100 is configured to removably attach to a tool (not shown) that rotates a bit 103. As non-limiting examples, such a tool may be embodied in the form of a hand drill, a power drill (e.g., an electric or pneumatic drill), a lathe, a die grinder, an impact wrench, or any other like tool.

The bit assembly 100 includes the bit 103, a bit identification assembly 106, and possibly other components. The bit identification assembly 106 attaches to the bit 103 and facilitates identifying and tracking the bit 103. To this end, the bit identification assembly 106 may include a core 109, an electronic identification device 113, a cover 116, one or more retaining elements 119, and possibly other components. When assembled, the weight distribution and/or shape of the bit identification assembly 106 may be axially symmetric to facilitate the balanced rotation of the bit assembly 100 when being rotated by, for example, the power tool.

Turning to FIGS. 2A-2C, shown is an example of the core 109 for the bit identification assembly 106 (FIGS. 1A-1C) according to various embodiments of the present disclosure. According to some embodiments, the core 109 may be formed a hardened material, such as a metal. The core 109 in the present embodiment includes a first side 203, a second side 206, and a bit receptacle 209 extending a through the core 109 from the first side 203 to the second side 206. The bit receptacle 209 may receive the bit 103 (FIGS. 1A-1C). As such, the bit receptacle 209 may have a shape that is similar to a cross-section of the bit 103. Thus, in the event that the bit 103 has a circular cross-section, the bit receptacle 209 may be a circular bore as shown in FIGS. 2A-2B. Similarly, if the bit 103 has a hexagonal cross-section, the bit receptacle 209 may be a hexagonal bore.

A recess 213 may be formed on an exterior surface of the core 109 where the electronic identification device 113 (FIGS. 1A-1C) is located when the bit identification assembly 106 is assembled. In the embodiment shown in FIGS. 2A-2B, the recess 213 is located on an edge surface 215 that is located between the first side 203 and the second side 206 of the core 109. In other embodiments, the recess 213 may be located on the first side 203, the second side 206, or any other suitable location of the core 109. As shown in the present example, the recess 213 may also include one or more sidewalls 216 that are located adjacent to ends of the electronic identification device 113 when the bit identification assembly 106 is assembled. The recess 213 in conjunction with the sidewalls 216 may provide protection for the electronic identification device 103 in the event of, for example, mechanical impact due to the bit assembly 100 being dropped or making contact with another object.

The core 109 may also include a retaining element receptacle 219 that receives and retains the retaining element 119 (FIGS. 1A-1C). The retaining element receptacle 219 may include threads along at least a portion of the retaining element receptacle 219 for receiving corresponding threads on the retaining element 119. In some embodiments, a shoulder (not shown) may also extend along a periphery of the retaining element receptacle 219 to limit the depth to which the retaining element 119 may insert.

One or more grooves 223a-223b may be formed in at least a portion of the edge surface 215 that is located between the first side 203 and the second side 206 of the core 109. As will be discussed later, these grooves 223a-223b receive a tab, lip, protrusion, or other feature on the cover 116 (FIGS. 1A-1C) to facilitate retaining the cover 116 to the core 109. Additionally, an adhesive may be placed in the grooves 223a-223b to assist in retaining the cover 116 to the core 109.

An extension 226 may also extend from the first side 203 of the core 109. When the bit assembly 100 is assembled, the extension 226 may extend through an opening in the cover 116 so that the extension 226 is beyond the cover 116. In this configuration, the extension 226 may prevent the cover 116 from being damaged, for example, in the event that the bit identification assembly 106 makes contact with a workpiece while the bit assembly 100 (FIGS. 1A-1C) is rotating. For instance, while drilling a hole with the bit assembly 100, the bit 103 may pierce through the workpiece, and the bit identification assembly 106 may unintentionally contact the workpiece. By the extension 226 extending beyond the cover 116, which may be damaged relatively easily when contacting the workpiece, the cover 116 is prevented from making contact with the workpiece. Instead, the relatively rugged extension 226 of the core 109 makes contact with the workpiece.

Turning now to FIGS. 3A-3B, shown is an example of a portion of the cover 116 (FIGS. 1A-1C) for the bit identification assembly 106 (FIGS. 1A-1C) according to various embodiments of the present disclosure. In particular, FIGS. 3A-3B show a cover portion 300 that forms a part of the cover 116. In the bit identification assembly 106 shown in FIGS. 1A-1C, a pair of identical cover portions 300 join together to form the cover 116. In alternative embodiments, the cover portions 300 may not be identical. Even further, alternative embodiments of the cover 116 may be formed from a single piece, or the cover 116 may be formed from several pieces.

An identification signal from the electronic identification device 113 may be transmitted through the cover 116. As such, the cover portion 300, and thus the cover 116, may be constructed from nylon or any other plastic-type material to facilitate transmission of signals to and from the electronic identification device 113. The cover portion 300, and thus the cover 116, may be formed of other types of materials that are transparent to radio frequency energy as well.

In the present embodiment, the cover portion 300 may include a face 303, a rim 306, and possibly other components. When the bit identification assembly 106 is assembled, the face 303 of the cover portion 300 may abut the first side 203 (FIGS. 2A-2C) or the second side 203 (FIGS. 2A-2C) of the core 109 (FIGS. 2A-2C), while the rim 306 may abut the edge surface 215 (FIGS. 2A-2C) of the core 109. The face 303 of the cover portion 300 may further include an opening 309 for the bit 103. Additionally, the extension 226 (FIGS. 2A-2C) from the first side 203 of the core 109 may fit within the opening 309.

The cover portion 300 may further include one or more tabs 313a-313d that extend from the rim 306 of the cover portion 300 and that are configured to insert into one of the grooves 223a-223b (FIGS. 2A-2C) of the core 109 to thereby retain the cover portion 300 to the core 109. In alternative embodiments, rings, prongs, barbs, lips, or any other feature may extend from the cover portion 300 and insert into one of the grooves 223a-223b. The face 303 of the cover portion 300 may also include ports 316a-316d that correspond to the tabs 313a-313d and that may facilitate formation of the cover portion 300 and the tabs 313a-313d when using an injection molding process. In this sense, a portion of a mold (not shown) used in an injection molding process to form the tabs 313a-313d may be removed though the ports 316a-316d.

In some embodiments, the tabs 313a-313d may be ramped. As such, a first surface 319 of each of the tabs 313a-313b is sloped with respect to the grooves 223a-223b, while a second surface 323 of each of the tabs 313a-313b is substantially perpendicular to the grooves 223a-223b. Such a configuration may facilitate the tabs 313a-313b being slipped into one of the grooves 223a-223b and prevent the 313a-313b from being removed from the groove 223a-223b when the bit identification assembly 106 is assembled.

Additionally, the face 303 and/or the rim 306 of the cover portion 300 may include one or more protrusions 326a-326c. When the bit identification assembly 106 is assembled, the protrusions 326a-326c may abut or press against the electronic identification device 113. By abutting or pressing against the electronic identification device 113, the protrusions 326a-326c may retain the electronic identification device 113 in a fixed position within the recess 213 and with respect to the core 109. Additionally, the protrusions 326a-326c may provide cushioning for the electronic identification device 113 in the event of a mechanical impact involving the bit identification assembly 106.

The cover portion 300 may further include at least a portion of a retaining element access port 329. In the example shown, the retaining element access port 329 is embodied as a semicircular-shaped port. Thus, when two cover portions 300 are joined over the core 109, the two semicircular-shaped portions of the retaining element access port 329 form the retaining element access port 329. The retaining element access port 329 facilitates a tool (not shown), such as a hex or other type of key, accessing the retaining element 119 (FIGS. 1A-1C) when the bit identification assembly 106 is assembled.

Reference is now made back to FIGS. 1A-1C. The retaining element 119 is configured to insert into the retaining element receptacle 219 in the core 109 and into a notch 123 in the bit 103 to thereby retain the core 109, and thus the bit identification assembly 106, to the bit 103. To this end, the retaining element 119 may be embodied in the form of a threaded set screw or other type of screw. The retaining element 119 may further include a head 126 that receives a tool (not shown), such as a hex or other type of key, for screwing and unscrewing the retaining element 119. In some embodiments, the head 126 may be configured to receive a proprietary or uncommon tool to prevent unauthorized removal of the retaining element 119, and thus the bit 103, from the bit identification assembly 106. In alternative embodiments, pins, welds, epoxies, other mechanisms, or any combination thereof may be used to attach the core 109 to the bit 103.

The electronic identification device 113 emits an identification signal that is capable of being received by an appropriate reader (not shown). The identification signal includes data that uniquely corresponds to the electronic identification device 113, thereby facilitating the identification of the bit 103 to which the electronic identification device 113 is attached. The electronic identification device 113 may be active, semi-active, or passive and may or may not include programmable storage memory. In various embodiments, the electronic identification device 113 may be embodied in the form of an RFID tag or another type of electronic device capable of emitting an identification signal.

The bit 103 may be, for example, a drill bit, a driver bit, or any other type of like device that functions by rotating about a longitudinal axis (not shown). In the embodiment shown in FIGS. 1A-1C, the bit 103 is embodied in the form of a drill bit. However, a driver bit may be used in the embodiment shown as well. The bit 103 has a first end 129 and a second end 133. For the case in which the bit 103 is a drill bit, the first end 129 of the bit 103 may configured to cut into the workpiece to create a hole in the workpiece. For the case in which the bit 103 is embodied in the form of a driver bit, the first end 129 of the bit 103 may be configured to drive a fastener, such as but not limited to a screw, a nut, or any other type of fastener that fastens by being rotated. The second end 133 of the bit 103 may be configured to removably insert into a chuck or other type of receptacle in a tool that rotates the bit 103. As such, the bit 103 may include a groove (not shown) or other type of feature to facilitate removable attachment of the bit 103 to the tool that rotates the bit. As previously mentioned, the bit 103 may include the notch 123 that is configured to receive the retaining element 119. According to various embodiments, the notch 123 may be a groove, a hole, or any other feature into which an end of the retaining element 119 may insert.

Next, an example of assembling the bit assembly 100 of FIGS. 1A-1C is provided. It is emphasized that assembling of the bit assembly 100 may be performed in an alternative order than in the description provided below. To begin, the bit 103 is inserted into the bit receptacle 209 of the core 109, so that the notch 123 of the bit 103 aligns with the retaining element receptacle 219 of the core 109. Thereafter, the retaining element 119 is inserted into the retaining element receptacle 219 of the core 109 and tightened by screwing until the retaining element 119 is inserted into the notch 123 and tightened against the bit 103. Thus, the core 109 is retained to the bit 103, and axial movement and rotation of the bit 103 with respect to the core 109 is prevented. In some embodiments, thread-locking compounds or components may be used to prevent the retaining element 119 from withdrawing from the bit 103.

The electronic identification device 113 is placed in the recess 213 of the core 109. In some embodiments, an adhesive, epoxy, shrink wrap, or other attachment mechanism may be used to attach the electronic identification device 113 to the core 109. Thereafter, a first cover portion 300, referred herein as the cover portion 300*a*, is slid over the first end 129 of the bit 103. Similarly, a second cover portion 300, referred to herein as the cover portion 300*b*, is slid over the second end 133 of the bit 103. The first cover portion 300*a* and the second cover portion 300*b* are joined together over the core 109, so that the tabs 313*a*-313*d* (FIGS. 3A-3B) insert into the grooves 223*a*-223*b* on the edge surface 215 (FIGS. 2A-2C) of the core 109. Thus, the cover portions 300*a*-300*b* are retained to the core 109. In some embodiments, adhesives, epoxies, shrink wrap, or other materials may be applied to the first cover portion 300*a*, the second cover portion 300*b*, and/or the core 109 to facilitate retaining the cover 101 to the core 109. When assembled, the weight distribution and/or shape of the bit assembly 100 is axially symmetrical. Accordingly, the bit assembly 100 may have a balanced rotation when being rotated at a high rate by, for example, a power tool.

With the bit assembly 100 being assembled, an electronic identification device reader (not shown), such as an RFID reader, may receive the identification signals emitted from the electronic identification device 113 that is attached to the bit 103. Thus, the electronic identification device reader may identify and track the bit 103 for various purposes. Additionally, the bit 103 is able to removably attach to the power tool and perform its intended functionality while being attached to the bit identification assembly 106.

It may be desirable to remove or replace the bit 103 in the bit assembly 100. For instance, the bit 103 may become dull or damaged and require replacement. In order to remove the bit 103, a tool, such as a hex or other type of key, may insert into the retaining element access port 329 and loosen the retaining element 119 against the bit 103, for example, by unscrewing the retaining element 119. When the retaining element 119 has been withdrawn from the notch 123 in the bit 103, the bit 103 may be slid out of the core 109. To replace the bit 103, a replacement bit 103 may be inserted into the bit receptacle 209 of the core 109, so that the notch 123 in the bit 103 is aligned with the retaining element receptacle 219 of the core 109. Thereafter, the retaining element 119 may be tightened against the bit 103, so that the replacement bit 103 is thereby retained to the bit identification assembly 106.

Figure 4A:
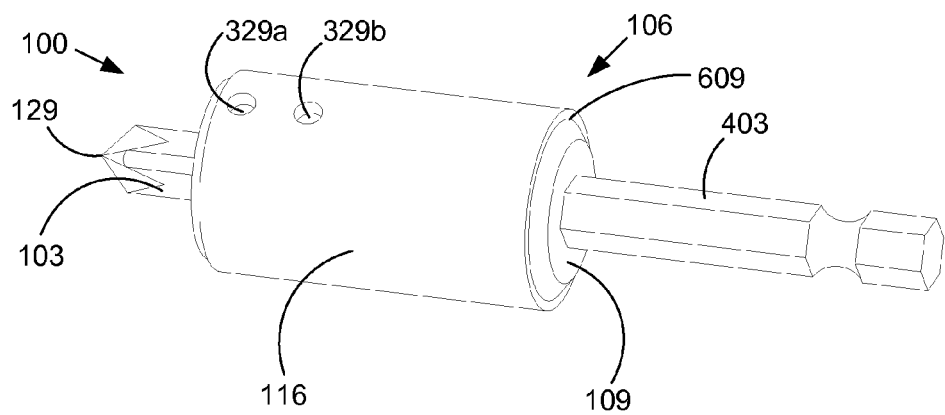
FIGS. 4A-4C are drawings of another example of a bit assembly according to various embodiments of the present disclosure.
Figure 4B:
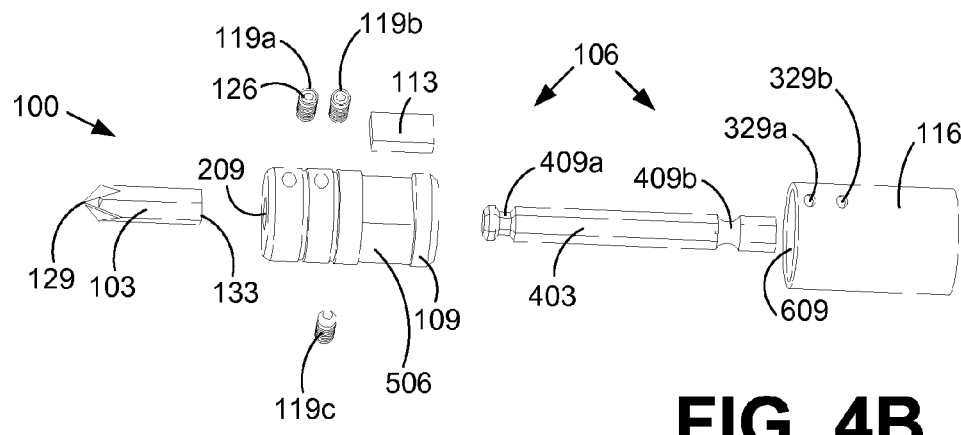
Figure 4C:
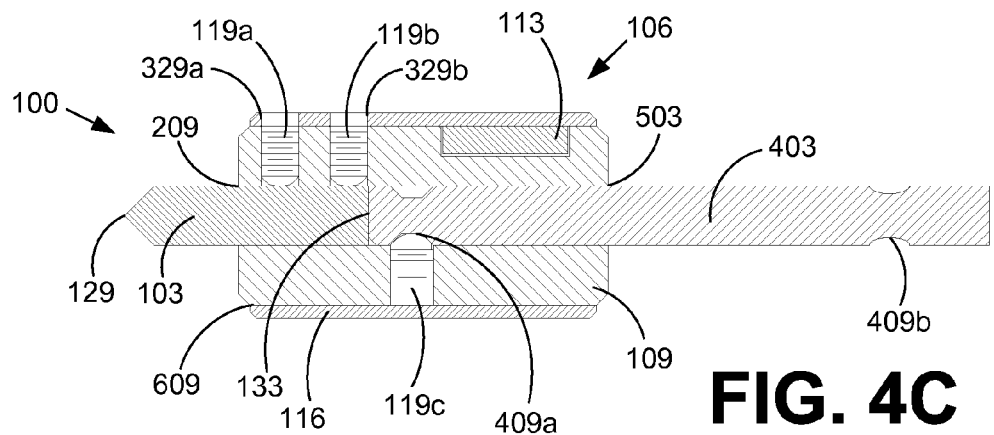

Turning now to FIGS. 4A-4C, shown is another example of the bit assembly 100 according to various embodiments of the present disclosure. In particular, FIG. 4A shows a perspective view of the bit assembly 100, FIG. 4B shows an exploded view of the bit assembly 100, and FIG. 4C shows a cross-section view of the bit assembly 100.

The bit assembly 100 shown in FIGS. 4A-4C is similar to the bit assembly 100 shown in FIGS. 1A-1C. The bit assembly 100 includes the bit 103, the bit identification assembly 106, and potentially other components. The bit identification assembly 106 in the present example now includes the core 109, the electronic identification device 113, the cover 116, multiple retaining elements 119, now referred to the retaining elements 119*a*-119*c*, a drive shaft 403, and potentially other components. The bit identification assembly 106 is configured to attach to the bit 103 and to removably attach to a tool (not shown) that rotates the drive shaft 403 and thus the bit identification assembly 106.

Figures 5A, 5B:
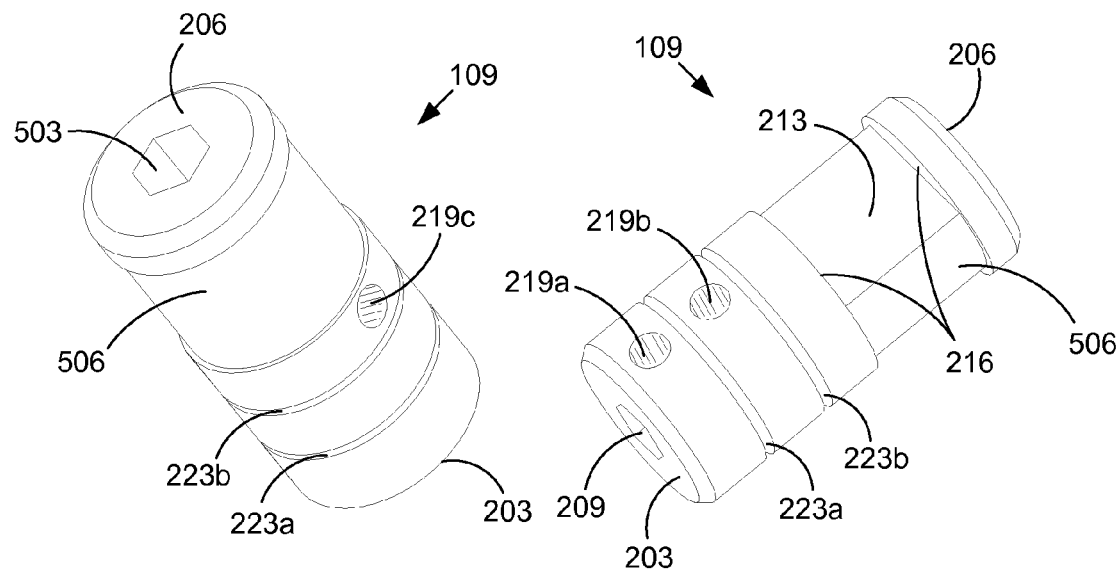
FIGS. 5A-5B are drawings of an example of a core for the bit assembly of FIGS. 4A-4C according to various embodiments of the present disclosure.

Turning to FIGS. 5A-5B, shown is an example of the core 109 for the bit assembly 100 of FIGS. 4A-4C according to various embodiments. The core 109 in the present example includes the first face 203, the second face 206, the bit receptacle 209 extending into the core 109 from the first face 203, a drive shaft receptacle 503 extending into the core 109 from the second face 206, and potentially other components. It is noted that, in the present example, the bit receptacle 209 and the drive shaft receptacle 503 have the same shape and are connected within the core 109. In other embodiments, the bit receptacle 209 and the drive shaft receptacle 503 may or may not have the same shape or size and may or may not be connected in the core 109. As with the bit receptacle 209, the drive shaft receptacle 503 may be sized and shaped to be similar to the size and shape of a cross-section of the drive shaft 403. As such, the drive shaft receptacle 503 and the cross-section of the drive shaft 403 may be hexagonal, for example, to prevent rotation of a hexagonal drive shaft 403 with respect to the core 109.

The core 109 in the present embodiment also includes the recess 213 and the sidewalls 216. In addition, a longitudinal portion 506 of the core 109 corresponding to where the recess 213 and/or the electronic identification device 113 (FIGS. 4A-4C) are located may be recessed with respect to the other portions of the core 109. The recessed longitudinal portion 506 may accommodate an increase in diameter due to, for example, shrink wrap, tape, an adhesive, or any other component that may be placed over the recess 213 and/or around the longitudinal portion 506. Thus, shrink wrap, for example, may surround the electronic identification device 113 and the longitudinal portion 506 of the core 109 and not interfere with the cover 116 being slid over these components.

Similar to the embodiment shown in FIGS. 2A-2C, the core 109 in the present embodiment may include the grooves 223a-223b that may receive the tabs 313a-313d (FIGS. 3A-3B) in the cover 116. As previously mentioned, the present embodiment of the bit assembly 100 may include multiple retaining elements 119a-119c (FIGS. 4A-4C). As such, the core 109 in the present embodiment may include multiple retaining element receptacles 219, referred to herein as the retaining element receptacles 219a-219c. In particular, the retaining element receptacles 219a-219b may receive the retaining elements 119a-119b, and the retaining element receptacle 219c may receive the retaining element 119c. It is emphasized that alternative embodiments may include fewer or greater numbers of retaining elements 119a-119c and corresponding retaining element receptacles 219a-219c. The retaining element receptacles 219a-219b may extend from the exterior surface of the core 109 to the bit receptacle 209. Similarly, the retaining element receptacle 219c may extend from the exterior surface of the core 109 to the drive shaft receptacle 503.

Figure 6:
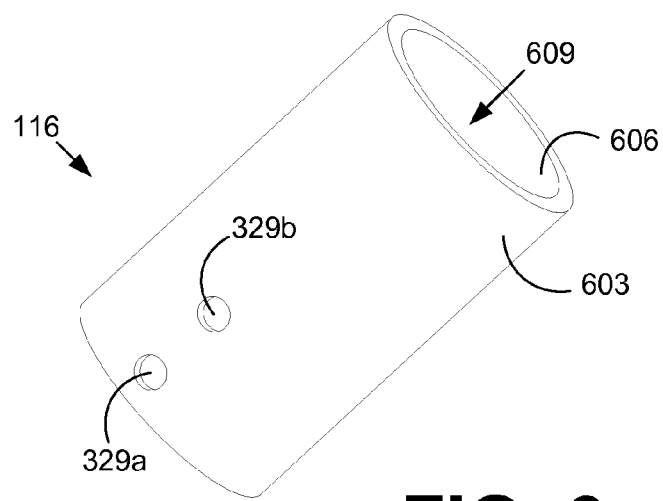
FIG. 6 is a drawing of an example of a cover for the bit assembly of FIGS. 4A-4C according to various embodiments of the present disclosure.

With reference now to FIG. 6, shown is an example of the cover 116 for the bit assembly 100 of FIGS. 4A-4C according to various embodiments. In the present embodiment, the cover 116 is embodied as a hollow tube having an outer surface 603 and an inner surface 606 that defines an opening 609. The cover 116 is configured to slip over the core 109 (FIGS. 5A-5B) and the electronic identification device 113 (FIGS. 4A-4C). As such, the cover 116 may be constructed of nylon, a plastic-type material, or any other material that through which signals from the electronic identification device 113 can be transmitted.

The cover 116 may further include one or more of the retaining element access ports 329, referred to herein as the retaining element access ports 329a-329b. The retaining element access ports 329a-329b may facilitate a tool (not shown), such as a hex or other type of key, accessing the retaining elements 119a-119b in the retaining element receptacles 219a-219b as previously discussed.

Reference is now made back to FIGS. 4A-4C. The bit 103 shown in FIGS. 4A-4C may be similar to the bit 103 shown in FIGS. 1A-1C. As such, the bit 103 includes the first end 129 and the second end 133. According to various embodiments, the bit 103 may have one or more receptacles (not shown), such as the notches 123, that are configured to receive the retaining elements 119a-119b. In the present example, a driver bit is shown, but alternative embodiments may include a drill bit or other type of bit 103.

The drive shaft 403 is a component of the bit identification assembly 106 that is configured to removably attach to, for example, a power tool (not shown) and attach to the core 109. The drive shaft 403 may include one or more grooves 409a-409b. The first groove 409a may be configured to receive the retaining element 119c when the bit identification assembly 106 is assembled. The second groove 409b may facilitate removable attachment of the drive shaft 403 to a tool, such as an air tool. Other suitable attachment mechanisms for the drive shaft 403 may be used as well.

Next, an example of assembling the bit assembly 100 of FIGS. 4A-4C is provided. It is emphasized that assembling of the bit assembly 100 may be performed in an alternative order than in the description provided below. To begin, the electronic identification device 113 may be placed in the recess 213 (FIG. 1B-1C) of the core 109. In some embodiments, an adhesive, epoxy, or other compound may be placed between the recess 213 and the electronic identification device 113. Thereafter, shrink wrap, tape, a rubber band, or any other type of material may be placed over the electronic identification device 113 and the recessed longitudinal portion 506 of the core 109 to facilitate retaining the electronic identification device 113 to the core 109. The recessed longitudinal portion 506 of the core 109 may accommodate the extra thickness that may be added to profile of the core 109 due to the shrink wrap, tape, rubber band, or other type of material.

Next, the drive shaft 403 may be inserted into the drive shaft receptacle 503, and the groove 409a may be aligned with the retaining element receptacle 219c (FIG. 5A). Thereafter, the retaining element 119c may be inserted and screwed into retaining element receptacle 219c. By the retaining element 119c extending into the groove 409b and being tightened against the drive shaft 403, the drive shaft 403 is retained to the core 109 and prevented from moving axially or rotating with respect to the core 109. In some embodiments, thread-locking compounds or components may be used to prevent the retaining element 119c from withdrawing from the drive shaft 403.

Similarly, the bit 103 may be inserted into the bit receptacle 209 of the core 109. In embodiments in which the bit 103 includes one or more notches 123 (FIG. 1C), the notches 123 may be aligned with the retaining element receptacles 219a-219b (FIG. 5B). With the bit 103 inserted into the bit receptacle 209, the retaining elements 119a-119b may be inserted into the retaining element receptacles 219a-219b and tightened against the bit 103. By the retaining elements 119a-119b being tightened against the bit 103, the bit 103 is prevented from being moving axially or rotating with respect to the core 109. In some embodiments, thread-locking compounds or components may be used to prevent the retaining elements 119a-119b from withdrawing from the bit 103.

The drive shaft 403 or the bit 103 may then be inserted into the opening 609 of the cover 116, and the cover 116 may be slid over the core 109. In embodiments where the inner surface 606 (FIG. 6) of the cover 116 includes one or more tabs 313a-313d (FIGS. 3A-3B), the tabs 313a-313d may insert into the grooves 223a-223b in the core 109 to facilitate retaining the cover 116 to the core 109. When assembled, the weight distribution and/or the shape of the bit assembly 100 is axially symmetrical. As such, the bit assembly 100 may have a balanced rotation when being rotated at a high rate by, for example, a power tool.

With the bit assembly 100 assembled as shown in FIG. 4A, the drive shaft 403 may be inserted into, for example, the chuck of an air tool (not shown) or other type of tool (not shown), and the bit 103 may be used to, for example, drive a fastener. In the event that the bit 103 is to be removed or replaced, a tool, such as a hex or other type of key, may insert into the retaining element access ports 329*a*-329*b* and unscrew the retaining elements 119*a*-119*b*. When the retaining elements 119*a*-119*b* have been withdrawn from the bit 103, the bit 103 may be removed from the bit receptacle 209. To replace the bit 103, a replacement bit 103 may be inserted into the bit receptacle 209 of the core 109, and the retaining elements 119*a*-119*b* may be tightened against the bit 103 so that the bit 103 is thereby retained to the bit identification assembly 106.

Turning now to FIGS. 7A-7C, shown is another example of the bit assembly 100 according to various embodiments of the present disclosure. In particular, FIG. 7A shows a perspective view of the bit assembly 100, FIG. 7B shows an exploded view of the bit assembly 100, and FIG. 7C shows a cross-section of the bit assembly 100. The bit assembly 100 in the present embodiment is similar to the bit assembly 100 shown in FIGS. 4A-4C. However, in the present embodiment, the drive shaft 403 is formed as a portion of the core 109. As shown, the bit assembly 100 includes the bit 103, the bit identification assembly 106, and possibly other components. The bit identification assembly 106 may further include the core 109, the electronic identification device 113, the cover 116, one or more retaining elements 119, and possibly other components.

Turning to FIGS. 8A-8B, shown is the core 109 for the bit identification assembly 106 of FIGS. 7A-7C according to various embodiments. The core 109 in the present example includes a body 803, a neck 806, the drive shaft 403 formed as a portion of the core 109, and possibly other features. The body 803 of the core includes the bit receptacle 209. In the present embodiment, a recessed groove 809 may be formed circumferentially in an in the interior wall 813 of the bit receptacle 209. As will be discussed below, the groove 809 receives the retaining element 119 (FIGS. 7A-7C) to facilitate retaining the bit 103 to the core 109. In alternative embodiments, a ring, tab, barb, or other type of feature may extend from within the interior wall 813 of the bit receptacle 209 and, for example, insert into the bit 103 (FIGS. 7A-7C) to facilitate the attachment thereof.

The neck 806 of the core 109 may include a flat platform 816 where the electronic identification device 113 (FIGS. 7A-7C) is placed when the bit assembly 100 is assembled. Additionally, a cover retaining groove 807 may be located, for example, on the neck 806 and/or the drive shaft 403. As will be discussed later, the cover retaining groove 807 may receive a rim or other type of feature on the cover 116 (FIGS. 7A-7C) to facilitate the cover 116 being retained to the core 109. In alternative embodiments, a rim, protrusion, tab, prong, or other type of feature may protrude from the core 109 and insert into the cover 116 to facilitate the cover 116 being retained to the core 109.

As previously mentioned, the drive shaft 403 may include the groove 409*b* to facilitate removable attachment of the drive shaft 403 to a tool, such as an air tool, that rotates the drive shaft 403 and thus the bit identification assembly 106. The drive shaft 403 in the present embodiment has a hexagonal cross-section. However, the cross-section of the drive shaft 403 in alternative embodiments may be other shapes as well. For instance, the drive shaft 403 may have a circular cross-section.

With reference now to FIG. 9A-9C, shown is the cover 116 for the bit identification assembly 106 in FIGS. 7A-7C. The cover 116 in the present embodiment includes the outer surface 603 and the inner surface 606 that defines an opening 609. Additionally, the cover 116 may include a lip 903 and one or more ridges 906*a*-906*e*. It is noted that although the present embodiment shows the ridges 906*a*-906*e*, alternative embodiments may include fewer or greater numbers of ridges 906*a*-906*e*.

The lip 903 extends inward from the inner surface 606 of the cover 116 and insert into the cover retaining groove 807 (FIGS. 8A-8B). In some embodiments, a surface of the lip 903 may be ramped with respect to the cover retaining groove 807, to facilitate the lip 903 being inserted into the cover retaining groove 807, and another surface of the lip 903 may be perpendicular with respect to the cover retaining groove 807 to prevent the lip 903 from being removed from the cover retaining groove 807.

The ridges 906*a*-906*e* also extend inward from the inner surface 606 of the cover 116. When the bit identification assembly 106 is assembled, edges the ridges 906*a*-906*e* may abut the neck 806 of the core 109. Additionally, the electronic identification device 113 (FIGS. 7A-7C) may fit between the ridges 906*a* and 906*b* when the bit identification assembly 106 is assembled. As such, the cover 116 in conjunction with the ridges 906*a* and 906*b* may retain the electronic identification device 113 against the platform 816 on the core 109. Additionally, the cover 116 in conjunction with the ridges 906*a*-906*b* may protect the electronic identification device 113 in the event of a mechanical impact. The ridges 16 in some embodiments may be sloped to accommodate the corresponding sloped shape of the core 109.

Reference is now made back to FIGS. 7A-7C. The retaining element 119 in the present embodiment is embodied in the form of a rigid ring. As such, the retaining element 119 may include an inner edge 703, an outer edge 706, and possibly a gap 709. The retaining element 119 may be compressible, in that the radius of the retaining element 119 decreases by the size of the gap 709 shrinking. As will be discussed in more detail below, the retaining element 119 is configured to insert into the groove 809 in the bit receptacle 209 to retain the bit 103 in the bit receptacle 209.

The bit 103 in the embodiment of FIGS. 7A-7C is similar to the embodiments discussed above. In particular, the bit 103 shown is a driver bit configured to drive a fastener. However, a drill bit may be used in the present embodiment as well. The bit 103 in the present example includes multiple notches 123. In the present example, the notches 123 are located at each longitudinal edge of the bit 103. In other embodiments, the notches 123 may be located other places on the bit 103, or a notch 123 may extend completely around a circumference or periphery of the bit 103. The notches 123 in the bit 103 receive the retaining element 119 and facilitate the bit 103 being retained to the bit 103.

Next, an example of assembling the bit assembly 100 of FIGS. 7A-7C is provided. It is emphasized that assembling the bit assembly 100 may be performed in an alternative order than in the description provided below. To begin, the electronic identification device 113 may be placed on the platform 816 of the core 109. In some embodiments and adhesive, epoxy, or other compound may be placed between the electronic identification device 113 and the platform 816. In other embodiments, tape, shrink wrap, or other materials may wrap around the electronic identification device 113 and the neck 806 of the core 109.

Thereafter, the drive shaft 403 may be inserted into the opening 609 in the cover 116, and the cover 116 may be slid over the core 109 so that the lip 903 inserts into the cover retaining groove 807. Thus, the cover 116 is retained to the core 109, with the cover 116 covering the electronic identification device 113 and at least a portion of the core 109.

Next, the bit 103 may be inserted into the retaining element 119 so that the inner edge 703 of the retaining element 119 is aligned with the notches 123 in the bit 103. The bit 103 and the accompanying retaining element 119 may then insert into the bit receptacle 209 of the core 109. When the retaining element 119 contacts the interior wall 813 of the bit receptacle 209, the gap 709, and thus the radius of the retaining element 119, may shrink. As the bit 103 and the accompanying retaining element 119 are inserted further into the bit receptacle 209, the retaining element 119 may align with the groove 809 in the bit receptacle 209. Upon the groove 809 and the retaining element 119 becoming aligned, the retaining element 119 may expand to its previous radius and occupy the groove 809 in the bit receptacle 209 and the notches 123 in the bit. In this configuration, the bit 103 is retained within the bit receptacle 209. When assembled, the weight distribution and/or shape of the bit assembly 100 may be axially. As such, the bit assembly 100 may have a balanced rotation when being rotated at a high rate by, for example, a power tool.

The drive shaft 403 may insert into, for example, the chuck or other appropriate receptacle in a power tool, and the bit assembly 100 may be used, for example, to drive a fastener. In the event that the bit 103 is to be removed from the bit identification assembly 106, pliers, a vice, or other gripping tools may be used to separately grip the bit 103 and the bit identification assembly 106. The bit 103 and the bit identification assembly 106 may be pulled apart so that the retaining force provided by the retaining element 119 is overcome. In order to replace the bit 103, the retaining element 119 may be replaced or reused, and the process described above may be used to insert the replacement bit 103.

Turning now to FIGS. 10A-10D, shown is another example of the bit assembly 100 according to various embodiments of the present disclosure. In particular, FIG. 10A shows a perspective view of the bit assembly 100, FIGS. 10B-100 show perspective views of a portion of the bit assembly 100, and FIG. 10D shows a cross-section view of the bit assembly 100. The bit assembly 100 in the present example is similar to the bit assemblies 100 previously discussed. However, in the present embodiment, the bit identification assembly 106 functions as a collet that grips and retains the bit 103.

The bit assembly 100 in the present embodiment includes the bit 103, the bit identification assembly 106, and possibly other components. The bit 103 in the present embodiment is a driver bit. However, drill bits may be used in the present embodiment as well. The bit identification assembly 106 includes the core 109, the electronic identification device 113, the cover 116, a collar 1003, the retaining element 119, a cover retainer 1006, and possibly other components. As previously mentioned, the bit identification assembly 106 may retain the bit 103 by functioning as a collet. As such, the core 109 in the present embodiment may include a collet portion 1009, a threaded portion 1013, the recess 213, a head 1014, and potentially other features. As previously discussed, the recess 213 may be an area on the external surface of the core 109 where the electronic identification device 113 is placed when the bit identification assembly 106 is assembled. The head 1014 is a region of the core 109 near where the drive shaft 403 inserts into the core 109. As such, the head 1014 may include the drive shaft receptacle 503, a groove 1015, and possibly other features. The groove 1015 is a recess in the head 1014 that receives the cover retainer 1006.

The collet portion 1009 is a part of the core 109 that is configured to grip and retain the bit 103. To this end, the collet portion 1009 may include the bit receptacle 209 surrounded by multiple jaws 1016a-1016d that are separated by slots 1019a-1019d. The slots 1019a-1019d may also extend into a portion of the threaded portion 1013 of the core 109. As will be discussed later, the bit receptacle 209 expands or contracts as a result of the jaws 1016a-1016d flexing about the slots 1019a-1019d. Although FIGS. 10A-10D show four of the jaws 1016a-1016d and four of the slots 1019a-1019d, fewer or greater numbers of jaws 1016a-1016d and corresponding slots 1019a-1019b may be used in alternative embodiments.

The collar 1003 facilitates the jaws 1016a-1016d expanding and contracting the bit receptacle 209. To this end, the collar 1003 may include an opening having a threaded portion 1023 that mates with the threaded portion 1013 of the core 109. As the collar 1003 progresses towards the collet portion 1009 by being rotated about the core 109, the jaws 1016a-1016d are forced radially inward, thereby contracting the bit receptacle 209. On the other hand, as the collar 1003 retracts away from the collet portion 1009 by being rotated about the core 109, the jaws 1016a-1016d may move radially outward, thereby expanding the bit receptacle 209.

The cover 116 in the present embodiment includes a skirt 1026, a lip 1029, one or more slits 1033, and potentially other features. The skirt 1026 is a cylindrical portion of the cover 116 that covers the electronic identification device 113. The skirt 1026 may also fit in a gap 1036 formed between the opening of the collar 1003 and the threaded portion 1013 of the core 109. The slits 1033 may facilitate the end of the skirt 1026 contracting radially to fit in the gap 1036. In this sense, the end of the skirt 1026 may flex about the slits 1033 when being inserted into the gap 1036.

The cover retainer 1006 is a component that retains the cover 116 to the core 109. As such, the cover retainer 1006 inserts into the groove 1015 in the head 1014 of the core 109. In the present example, the cover retainer 1006 is embodied in the form of a retaining ring. Other components, such as pins or fasteners, that retain the cover 116 to the core 109 may be used in other embodiments.

The retaining element 119 in the present example is embodied in the form of a pin. Such a pin may be, for example, a rod, a spring coil pin, or any other similar component. The retaining element 119 inserts into the retaining element receptacle 219 that is located, for example, in the threaded portion of the core 109.

The drive shaft 403 in the present embodiment also includes a bore 1039 that receives the retaining element 119. Upon the retaining element 119 being inserted into the retaining element receptacle 219 and the bore 1039, the drive shaft 403 is retained to the core 109 by the retaining element 119. In alternative embodiments of the bit identification assembly 106, the drive shaft 403 may be formed as a part of the core 109, similar to as shown in FIGS. 8A-8B.

Next, an example of assembling the bit assembly 100 of FIGS. 10A-10D is provided. It is emphasized that assembling of the bit assembly 100 may be performed in an alternative order than in the description provided below. To begin, drive shaft 403 may be inserted into the drive shaft receptacle 503 in the core 109, so that the bore 1039 in the drive shaft 403 aligns with the retaining element receptacle 219 in the core 109. Thereafter, the retaining element 119 may be inserted into the retaining element receptacle 219 of the core 109 and into the bore 1039 of the drive shaft 403. The drive shaft 403 is then retained to the core 109.

Next, the bit 103 may be inserted into the bit receptacle 209 formed by the jaws 1016a-1016d of the core. The head 1014 of the core 109 may then be inserted into the opening of the collar 1003, and the collar 1003 may be rotated to screw and thereby progress the collar 1003 towards the collet portion 1009 of the core 109. By the collar 1003 progressing towards the collet portion 1009 of the core 109, the jaws 1016a-1016d are forced radially inward by the collar 1003. Thus, the jaws 1016a-1016d clamp down on and retain the bit 103 in the bit receptacle 209. In some embodiments, a thread-locking compound or component may be applied to the threaded portion 1013 of the core 109 to maintain the collar 1003 in the position that causes the jaws 1016a-1016d to clamp down on the bit 103.

The electronic identification device 113 may be placed on the recess 213 in the core 109. In some embodiments, an epoxy, adhesive, or other type of compound may be disposed between the electronic identification device 113 and the core 109 to attach the electronic identification device 113 to the core 109. Additionally, shrink wrap, tape, a rubber band, or any other material may be wrapped around the electronic identification device 113 and the head 1014 of the core 109 to facilitate retaining the electronic identification device 113 in position on the core 109.

The head 1014 of the core 109 may then be inserted into the skirt 1026 and through the opening formed by the lip 1029 of the cover 116. The skirt 1026 may then be slid over the core 109 so that the skirt 1026 inserts into the gap 1036 formed between the collar 1003 and the core 109 and so that the lip 1029 abuts a shoulder 1043 near the head 1014 of the core 109. Thereafter, the cover retainer 1006 may be inserted into the groove 1015 so that the cover retainer 1006 abuts and retains the cover 116. When assembled, the weight distribution and/or shape of the bit assembly 100 may be axially symmetric. As such, the bit assembly 100 may have a balanced rotation when being rotated at a high rate by, for example, a power tool.

The drive shaft 403 may be inserted into, for example, the chuck or other appropriate receptacle in a power tool, and the bit assembly 100 may be used, for example, to drive a fastener. In the event that the bit 103 is to be removed from the bit identification assembly 106, the collar 1003 may be unscrewed by being rotated with respect to core 109, and the bit 103 may be withdrawn from the bit receptacle 209. In order to replace the bit 103, the process described above may be used to insert the replacement bit 103.

It is emphasized that the above-described embodiments of the present disclosure are merely possible examples of implementations set forth for a clear understanding of the principles of the disclosure. Many variations and modifications may be made to the above-described embodiments without departing substantially from the spirit and principles of the disclosure. All such modifications and variations are intended to be included herein within the scope of this disclosure and protected by the following claims.

The invention claimed is:

1. A system, comprising:
a power drill;
a bit assembly removably attached to the power drill, the bit assembly comprising:
  a bit;
  a bit identification assembly attached to the bit, the bit identification assembly comprising:
    a core comprising a bit receptacle extending at least partially through the core, the bit being retained in the bit receptacle;
    an RFID tag attached to an exterior surface of the core, the RFID tag configured to transmit an identification signal; and
    a cover extending over at least a portion of the RFID tag and at least a portion of the core, wherein the RFID tag is configured to transmit the identification signal through the cover; and
an RFID reader configured to receive the identification signal from the RFID tag.

2. The system of claim 1, wherein the bit is a drill bit configured to drill a hole in a workpiece.

3. The system of claim 1, wherein the bit is a driver bit configured to drive a fastener.

4. The system of claim 1, wherein a weight distribution of the bit identification assembly is axially symmetric.

5. The system of claim 1, further comprising a drive shaft attached to the core, the drive shaft being removably attached to the power drill.

6. The system of claim 5, wherein the drive shaft is a portion of the core.

7. The system of claim 1, wherein the bit is removably attached to the power drill.

8. The system of claim 1, wherein the bit receptacle comprises a circular bore.

9. The system of claim 1, wherein the bit receptacle comprises a hexagonal bore.

10. The system of claim 1, wherein the core further comprises a recess where the RFID tag is disposed on the core.

11. An apparatus, comprising:
a bit identification assembly configured to attach to a bit, the bit being configured to removably attach to a tool that is configured to rotate the bit, the bit identification assembly comprising:
  a core comprising a bit receptacle configured to receive the bit; and
  an electronic identification device configured to be attached to an exterior surface of the core.

12. The apparatus of claim 11, wherein the bit identification assembly further comprises a cover configured to extend over at least a portion of the electronic identification device and at least a portion of the core; and
wherein the electronic identification device is configured to transmit an identification signal through the cover.

13. The apparatus of claim 12, wherein the core further comprises an extension on a side of the core that is configured to face a workpiece, the extension being configured to extend through the cover and prevent the cover from contacting the workpiece.

14. The apparatus of claim 12, wherein the cover further comprises a first cover piece and a second cover piece, the first cover piece being configured to extend at least partially over a first face of the core, the second cover piece being configured to extend at least partially over a second face of the core.

15. The apparatus of claim 12, wherein the cover further comprises means for maintaining the electronic identification device in a fixed position with respect to the core.

16. The apparatus of claim 11, wherein the bit identification assembly further comprises a retaining element configured to insert into the core and into the bit, to thereby retain the bit identification assembly to the bit.

17. The apparatus of claim 11, wherein the bit receptacle comprises a circular bore.

18. The apparatus of claim 11, wherein the bit receptacle comprises a hexagonal bore.

19. The apparatus of claim 11, wherein a weight distribution of the bit identification assembly is axially symmetrical.

20. The apparatus of claim 11, wherein the bit is a drill bit configured to drill a hole in a workpiece or a driver bit configured to drive a fastener.

21. An apparatus, comprising:
a bit identification assembly configured to attach to a bit, the bit identification assembly comprising:

a core comprising a bit receptacle in a first end of the core, the bit receptacle being configured to receive the bit;

a drive shaft extending from a second end of the core, the drive shaft being configured to removably attach to a tool that rotates the drive shaft; and an electronic identification device configured to be attached to an exterior surface of the core.

22. The apparatus of claim 21, wherein the bit identification assembly further comprises a cover configured to extend over at least a portion of the electronic identification device and at least a portion of the core; and wherein the electronic identification device is configured to transmit an identification signal through the cover.

23. The apparatus of claim 21, wherein the bit identification assembly further comprises a retaining element configured to insert into the core and into the bit, to thereby retain the bit identification assembly to the bit.

24. The apparatus of claim 23, wherein the retaining element is embodied in the form of a ring.

25. The apparatus of claim 24, wherein the ring further comprises a gap and is expandable.

26. The apparatus of claim 23, wherein the retaining element is embodied in the form of a threaded fastener.

27. The apparatus of claim 23, wherein the retaining element is embodied in the form of a pin.

28. The apparatus of claim 21, wherein the drive shaft is a portion of the core.

29. The apparatus of claim 21, wherein the bit identification assembly further comprises a retaining element configured to insert into the core and into the drive shaft, to thereby retain the drive shaft to the core.

30. The apparatus of claim 21, wherein a weight distribution of the bit identification assembly is axially symmetric.

31. The apparatus of claim 21, wherein the bit is a drill bit configured to drill a hole in a workpiece or a driver bit configured to drive a fastener.

32. The apparatus of claim 21, wherein the core further comprises a recess where the electronic identification device is disposed on the core.

33. An apparatus, comprising:

a bit identification assembly configured to attach to a bit, the bit identification assembly comprising:

a core comprising a collet at a first end of the core, the collet being configured to grip the bit; and an electronic identification device configured to attach to an exterior surface of the core.

34. The apparatus of claim 33, wherein the bit is configured to extend through a second end of the core and removably attach to a tool configured to rotate the bit.

35. The apparatus of claim 33, wherein the bit identification assembly further comprises a drive shaft extending from a second end of the core, the drive shaft being configured to removably attach to a tool that is configured to rotate the drive shaft.

36. The apparatus of claim 35, wherein the bit identification assembly further comprises a retaining element configured to insert into the core and into the drive shaft to thereby retain the drive shaft to the core.

37. The apparatus of claim 35, wherein the drive shaft is a portion of the core.

38. The apparatus of claim 33, wherein the bit identification assembly further comprises a collar configured to radially contract a plurality of jaws of the collet upon the collar moving towards the jaws of the collet.

39. The apparatus of claim 38, wherein:

the core further comprises a male threaded portion;

the collar further comprises a female threaded portion that corresponds to the male threaded portion of the core; and the collar is further configured to move towards the jaws of the collet by the female threaded portion of the collar rotating with respect to the core.

40. The apparatus of claim 33, wherein the bit identification assembly further comprises a cover configured to extend over at least a portion of the electronic identification device and at least a portion of the core; and wherein the electronic identification device is further configured to transmit an identification signal through the cover.

41. The apparatus of claim 40, wherein the bit identification assembly further comprises a cover retainer configured to retain the cover to the core.

42. The apparatus of claim 40, wherein the core further comprises a recess where the electronic identification device is located on the core.

43. The apparatus of claim 33, wherein the bit is a drill bit configured to drill a hole in a workpiece or a driver bit configured to drive a fastener.

* * * * *